United States Patent

Kurby

(10) Patent No.: US 7,433,330 B2
(45) Date of Patent: Oct. 7, 2008

(54) METHOD AND APPARATUS FOR SENDING IP MULTICAST PACKETS IN A WIRELESS COMMUNICATION SYSTEM

(75) Inventor: Phillip R. Kurby, Glendale Heights, IL (US)

(73) Assignee: Motorola, Inc., Schaumburg, IL (US)

(*) Notice: Subject to any disclaimer, the term of this patent is extended or adjusted under 35 U.S.C. 154(b) by 729 days.

(21) Appl. No.: 10/931,426

(22) Filed: Aug. 31, 2004

(65) Prior Publication Data

US 2006/0045087 A1    Mar. 2, 2006

(51) Int. Cl.
*H04H 20/71* (2008.01)

(52) U.S. Cl. .................. 370/312; 370/390; 370/432
(58) Field of Classification Search .................. None
See application file for complete search history.

(56) References Cited

U.S. PATENT DOCUMENTS

| 6,718,394 B2 | 4/2004 | Cain |
| 7,194,002 B2 * | 3/2007 | Zhang et al. ............... 370/400 |
| 2002/0126670 A1 * | 9/2002 | Yamauchi et al. ........... 370/390 |
| 2004/0218580 A1 * | 11/2004 | Bahl et al. .................. 370/350 |

OTHER PUBLICATIONS

Obraczka, et al., "Multicast Routing Issues in Ad Hoc Networks", USC Information Sciences Institute, Marina del Rey, CA, pp. 1-14.

* cited by examiner

*Primary Examiner*—Wing F. Chan
*Assistant Examiner*—Anthony Sol
(74) *Attorney, Agent, or Firm*—Randi L. Karpinia; Indira Saladi

(57) ABSTRACT

A method and apparatus for sending multicast packets from a first node to a plurality of nodes in a wireless communication system is disclosed. The method and apparatus comprise creating a neighbor list identifying a type of node for each neighboring node in the wireless communication network and sending a multicast request from the first node having a common type to a second node having a home type. Then, receiving the multicast request at the second node so that the second node can create a multicast packet from the multicast request and sending the multicast packet by the second node to the plurality of nodes in the wireless communication system.

9 Claims, 5 Drawing Sheets

METHOD AND APPARATUS FOR SENDING IP MULTICAST PACKETS IN A WIRELESS COMMUNICATION SYSTEM

FIELD OF THE INVENTION

The present invention relates generally to communication systems and in particular to the field of wireless communication systems supporting IP multicast technology.

BACKGROUND OF THE INVENTION

IP multicast technology in a wireless communication system has become increasingly important in recent years as the advent of ubiquitous computing has proliferated. IP multicast technology in a wireless communication system provides the ability for communications to be disseminated from one wireless device to many receiving wireless devices. As is known in the art, a multicast packet is used to send one communication to many devices. In the prior art, the process of sending the multicast packet to many devices requires that the multicast packet be forwarded and replicated many times which floods the wireless communication system with multicast packets.

Normally, the flooding of the communication system is not a problem. However, in a wireless communication system, where wireless devices are small and have limited power and storage capabilities, the flooding of the wireless communication system with packets causes the wireless devices to consume unnecessary power, waste bandwidth, and strains the wireless devices' limited storage capabilities.

Accordingly, there exists a need for an improved method of sending IP multicast packets in a wireless communication system.

BRIEF DESCRIPTION OF THE FIGURES

A preferred embodiment of the invention is now described, by way of example only, with reference to the accompanying figures in which.

Figure 1:
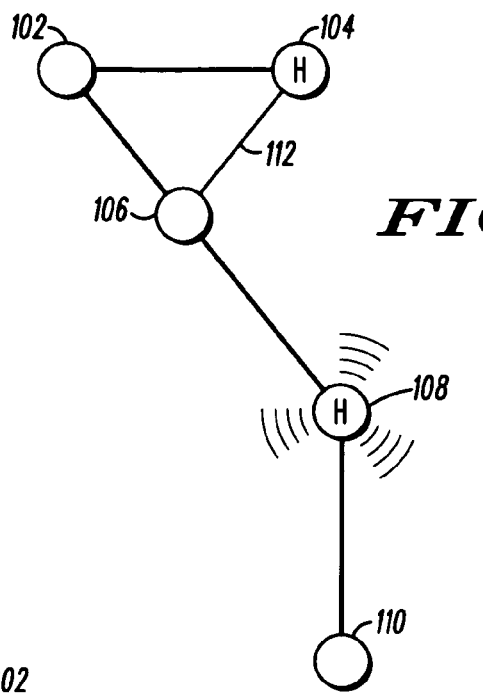
FIG. 1 is an example block diagram illustrating a typical wireless communication system in accordance with the invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION OF THE PREFERRED EMBODIMENT

Referring to FIG. 1, a wireless communication system 100 according to the present invention illustratively includes a plurality of nodes connected by wireless communications links denoted by straight lines, e.g. 112. In an illustrative embodiment, the wireless communication system is an ad-hoc network comprising wireless communication devices forming a temporary network without the aid of any centralized administration or standard support services. The nodes may be any suitable type of wireless communications device capable of communicating within an ad-hoc network, such as computers, personal data assistants (PDAs), etc. with wireless modems, as well as others, as will be appreciated by those of skill in the art. Certain of the nodes may also be connected to a fixed communications infrastructure, if desired.

According to the invention, each node has a neighbor list that comprises information about each node that the node is in communication with including information such as distance, signal strength, MAC address, number of hops, and a type that the node is where the type is an identifier such as home or common. As is known in the art, a node's neighbor list is also termed a routing table. Further, each neighbor list also has an entry for the node which hosts the neighbor list. For each node, there will be at least one node designated as a home node neighboring it. The process of designating a home node and the function therefore will be described further below.

Figure 2:
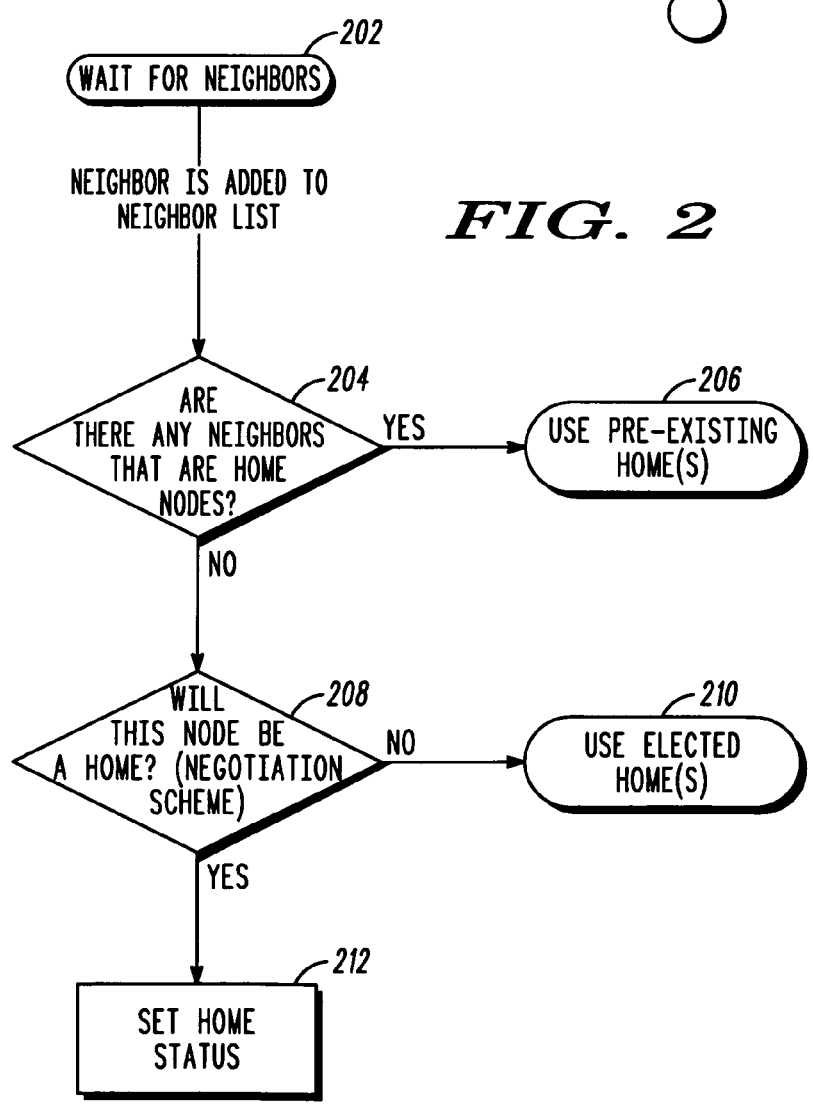
FIG. 2 is a flow diagram illustrating the method for creating a neighbor list and determining a home node in accordance with an embodiment of the invention.

A method of sending multicast packets to the nodes in the wireless communication system 100 according to the invention will now be described with reference to the flow diagrams of FIGS. 2-4. By way of example, FIG. 2 illustrates the process of a node discovering who neighboring nodes are and which node will become a home node. This process begins on power up. Using node 102 as an example, Node 102 checks to see if there are neighboring nodes by checking its neighbor list for entries for neighboring nodes. The process of populating the neighbor list is performed by a number of network protocols, such as beacon and distance vector routing, and is beyond the scope of this disclosure.

If there are no neighboring nodes, then node 102 waits until a neighboring node arrives (Block 202). After some time, node 102's neighbor list has an entry for node 104, in addition to the entry for node 102. When an entry is added to the neighbor list, which signals that a neighboring node is seen by the node, the node determines whether the neighboring node is a home node (Block 204). Node 102 looks in its neighbor list and checks to see if neighbor 104 is a home node. If one of its neighbors is a home node, then the node functions as a common node (Block 206). If none of its neighbors is a home node, then a negotiation takes place to determine whether the node will become a home node (Block 208).

In one embodiment, the negotiation used to determine which node becomes the home node is based upon a ranking of the MAC address of each node. For example, if three nodes have address 102, 104, and 106. The node with MAC address 106 will win the home node negotiation and become the home node. Alternative implementations may perform home node negotiation based upon other criteria including receiver or transmitter signal strength, manufacturer of node, IP address, and wireless device identifier.

If the node wins the home node negotiation, then the node sets a flag in the routing table to specify that it is a home node (Block 212). Setting home status (Block 212) may be performed by a number of alternative methods including 1) modifying the neighbor list to add a column denoting the type of node and 2) sending an advertisement specifying the type of node. In addition, the node functions as a home node (Block 212). Otherwise, the neighboring node becomes a home node and the node functions as a common node (Block 210). As an example, between nodes 102 and 104, node 104 has the higher MAC address and thus wins the home node negotiation to function as a home node.

In addition, the information relating to which nodes are home nodes and which nodes are common nodes is propagated throughout the network by the network protocols in the wireless communications system 100. As is known in the art, network topology information is propagated fairly often in ad-hoc networks. For example, if the network supports beacons, then the beacon process propagates information relating to which nodes are home nodes and which nodes are common nodes. As mentioned above, the network protocols utilized in the wireless communications system 100 is beyond the scope of this disclosure. In any case, each node takes the information propagated by the network protocol to populate its neighbor list to have knowledge of the network topology.

Figure 3:
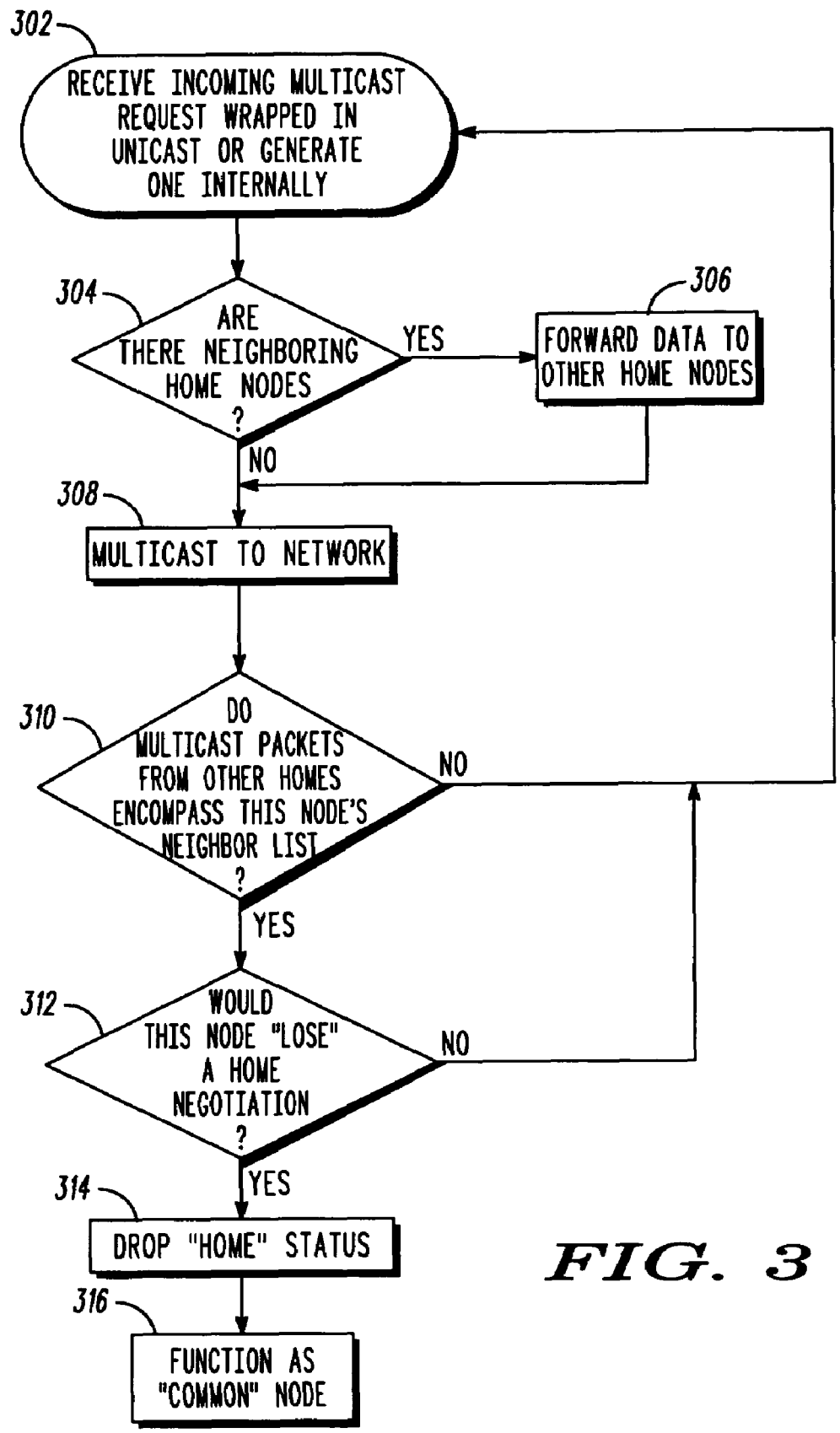
FIG. 3 is a flow diagram illustrating the functionality of a home node in accordance with an embodiment of the invention.

By way of example, FIG. 3 illustrates the functionality that a home node performs. In general, home nodes propagate multicast packets to the wireless network 100. The multicast packets can be sent on behalf of another node in the wireless communication network 100 or the home node can itself be the source of the multicast packet.

Figure 7:
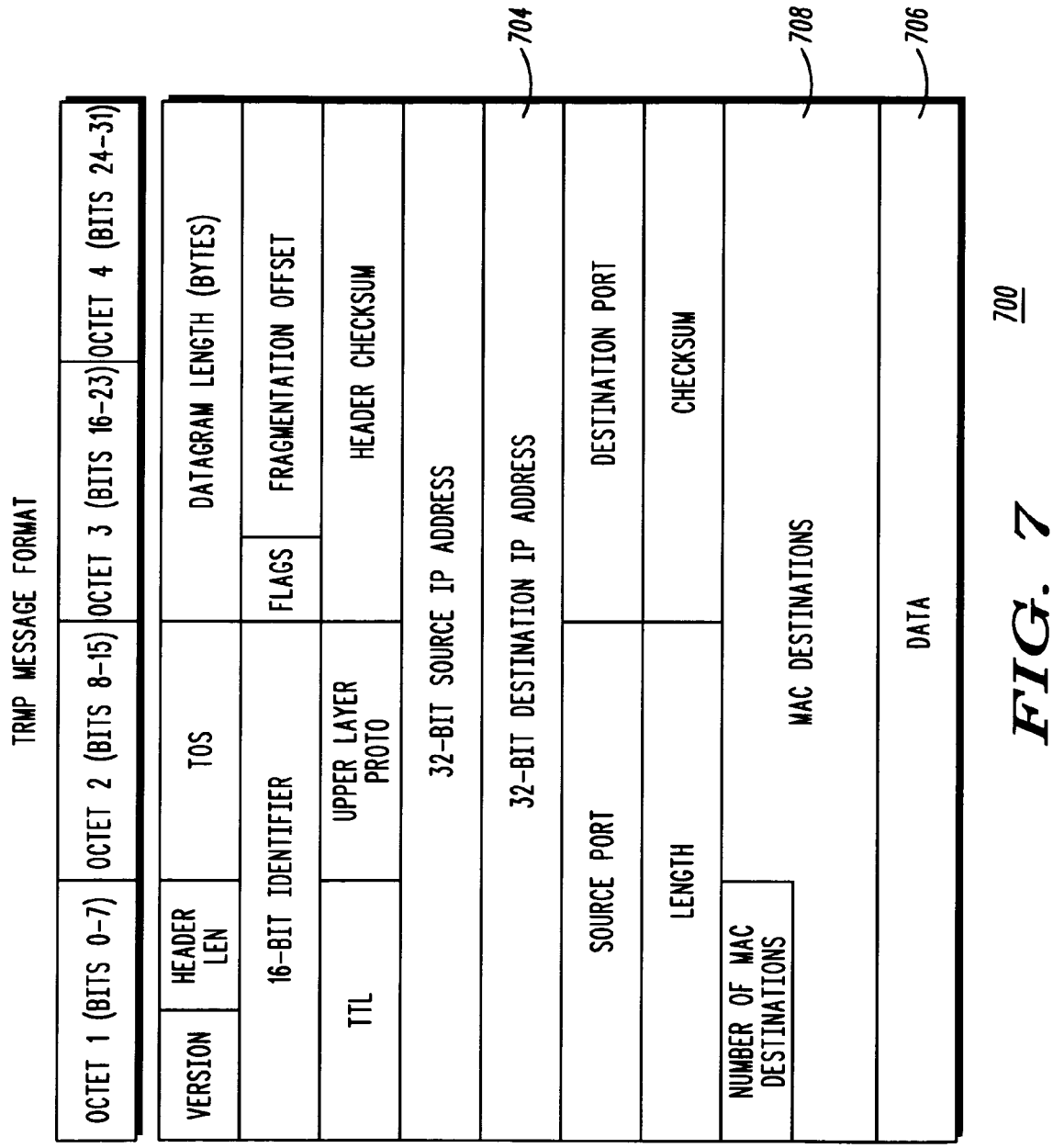
FIG. 7 is an example message format for an IP data packet in accordance with an embodiment of the invention.

In the case of where the home node propagates multicast packets on behalf of another node, the home node waits to receive such a request (Block 302). Using node 108 as an example, node 108 receives a multicast request from node 110. The multicast request is an IP data packet 700 as shown in FIG. 7 where the data field 706 comprises an IP multicast packet having a destination IP address of a multicast group and a source IP address of node 110. The multicast request is sent from node 110 to home node 108 as an IP data packet where the source IP address 710 is node 110 and the destination IP address 704 is node 108. Because the IP packet is sent to only one node, the multicast request is termed a unicast packet.

When home node 108 receives the multicast request, it first checks to see if there are any neighboring home nodes by checking its routing table for entries corresponding to neighboring nodes which are home nodes (Block 304). In this case, node 108's neighbors are nodes 110, 106 and neither are home nodes. Since neither are home nodes, node 108 will send the data field 706 of the multicast request to its neighbors, namely nodes 110, 106 (Block 308). That is, the multicast packet sent from node 110 is sent throughout the network from node 108 (Block 308). Instead of node 108 sending the multicast packet, node 110 sends the multicast packet on node 108's behalf. If node 106 were to be a home node, then node 108 would have taken the data field 706 of the multicast request and formulated an IP data packet to node 106. Thus, the multicast request is sent from node 110 to node 108 to node 106 (Block 306) to be sent out as a multicast packet from node 106 on behalf of node 110 (Block 308).

Figure 5:
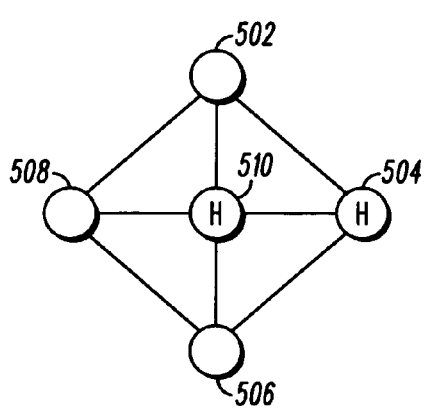
FIG. 5 is an example block diagram illustrating a typical wireless communication system for explaining the functionality of a home node.

Continuing, a home node checks to see if multicast packets sent from other home nodes encompass this home node's neighbor list (Block 310). An example of this situation is explained by reference to FIG. 5. In FIG. 5, node 506 sends a multicast request to node 504. Since node 504 is a home node, it checks to see if there are any neighboring home nodes by referring to its neighbor list for entries that reflect neighboring home nodes. Node 504 finds that it has a neighboring home node, namely node 510 and forwards the multicast request to node 510. In addition, node 504 formulates a multicast packet by retrieving the contents of the data field in the multicast request and sends the multicast packet to nodes 502, 510, 506. Node 510 also formulates a multicast packet by retrieving the contents of the data field in the multicast request and sends the multicast packet to nodes 502, 504, 506, 508. Thus, both node 504 and node 510 send the multicast message to their neighboring nodes. When node 504 receives the multicast packet from node 510, it checks a destination list 708 of the multicast packet it received to see if the destination list is encompassed by the nodes neighbor list (Block 310). In this case, the destination list 708 in the multicast packet received from node 510 has nodes 502, 504, 506, 508 and the neighbor list for node 504 is nodes 502, 504, 506, 510.

If the destination list is a superset of the neighbor list (Block 310), then the node determines whether it would lose a home negotiation (Block 312). Returning to FIG. 5, between node 504 and node 510, node 504 would lose the home node negotiation since it is the lower IP address between the two (Block 312). Thus, node 504 drops its home node status (Block 314) by changing the home node flag in its routing table and functions as a common node (Block 316) as outlined in FIG. 4. In contrast, node 510 does not lose the home negotiation and returns to waiting for incoming multicast requests (Block 302).

If the destination list is not a superset of the neighbor list (Block 310), like the home nodes in FIG. 1, e.g. node 104 and node 108 are home nodes but neither are a subset of either's neighbor list, then, each node stays a home node and returns to waiting for incoming multicast requests.

Figure 4:
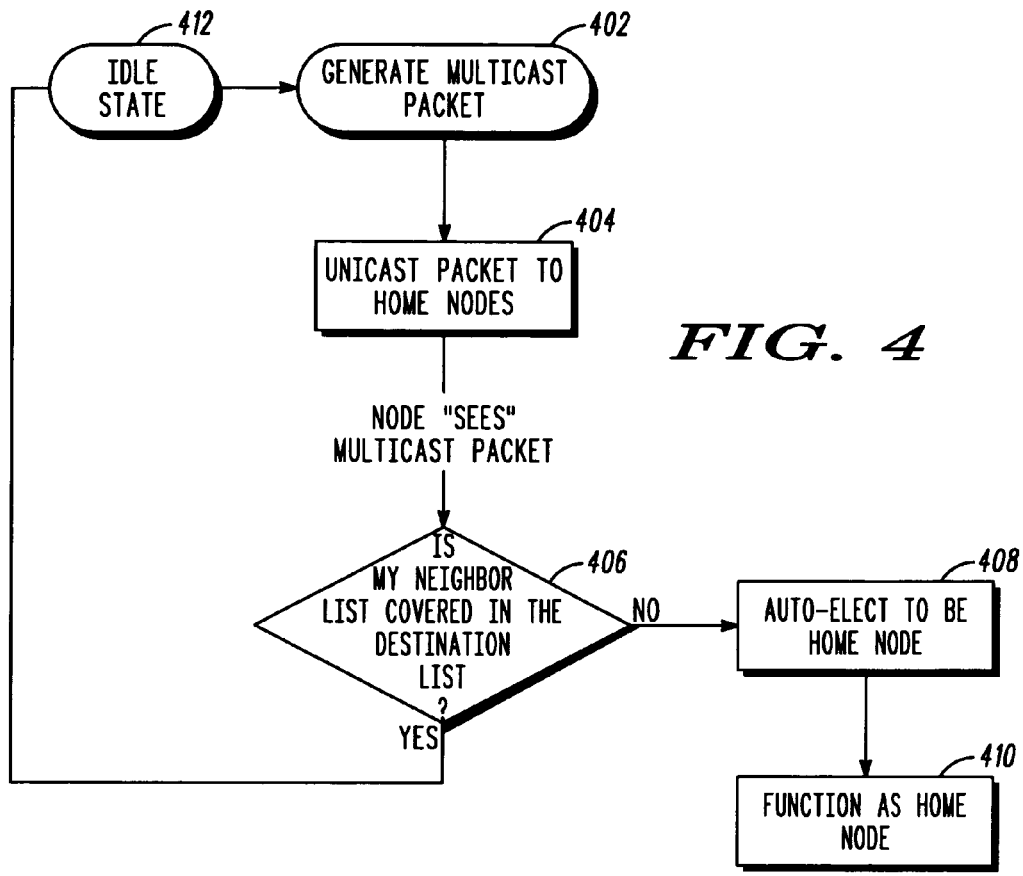
FIG. 4 is a flow diagram illustrating the functionality of a common node in accordance with an embodiment of the invention.

By way of example, FIG. 4 illustrates the functionality of a common node. Common nodes can not be a source of multicast packets, but are a source of multicast requests. Thus, common nodes request a home node to send a multicast packet on their behalf. The multicast request can also be thought of as a multicast packet wrapped by a unicast packet.

Referring to FIG. 5, node 506 wishes to send a multicast packet to the wireless communication system 100. Node 506 generates the multicast packet by adhering to IP multicasting protocols. Node 506 then takes the multicast packet and encapsulates it into the data field of an IP data packet (Block 402). As used herein, the IP data packet is termed a multicast request. The multicast request has a destination of a neighboring home node and is sent to its neighboring home nodes, namely nodes 504, 510 (Block 404). The nodes 504, 510 function as home nodes and send the multicast packet to the wireless communication system 100 on behalf of node 506.

Node 506 notes that it has received multicast packets from both node 504 and node 510. Node 506 determines whether its neighbor list is covered in the destination list of the multicast packets it has received (Block 406). Since node 506's neighbor list has nodes 504, 506, 508, 510 and the destination list on the multicast packet from node 510 has nodes 502, 504, 506, 508 and the destination list on the multicast packet from node 504 is nodes 502, 510, 506, node 506 determines that the destination list for the multicast packet from 510 is a superset of the neighbor list for node 506. Because the destination list for the multicast packet from 510 is a superset of the neighbor list for node 506, node 506 knows that the multicast packet has been sent to the wireless communication network 100 (Block 406). The node continues to waiting to generate a multicast request (Block 412).

Figure 6:
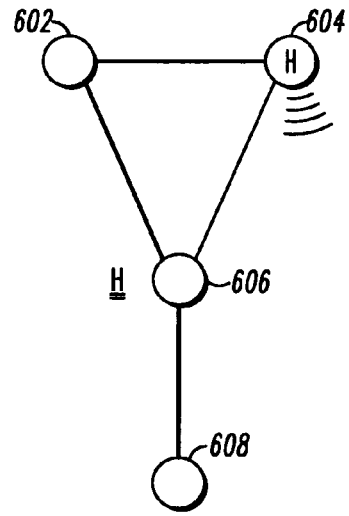
FIG. 6 is an example block diagram illustrating a typical wireless communication system for explaining the functionality of a common node.

If the common node's neighbor list is not covered in the destination list for the received multicast packet (Block 406), then the common node elects to be a home node (Block 408). An example of such a situation is explained with reference to FIG. 6. In FIG. 6, node 606 is originally not a home. To start off, node 602 generates a multicast request and sends the multicast request to home node 604. When node 606 receives the multicast packet from home node 604, node 606 asks whether its neighbor list is covered in the destination list of the received multicast packet. For example, for the multicast packet from home node 604, the destination list is nodes 602, 604, 606, but the neighbor list for node 606 is nodes 602, 604, 606, 608. Because the destination list is encompassed or is a subset of the neighbor list, node 606 elects to be a home node (Block 408). Node 606 auto elects to be a home node because there is a part of the wireless communication network 100 which is not covered by the multicast packet sent from node 604 (Blocks 406, 408). Once the node auto-elects to be a home node, the node functions as a home node (Block 410) as described in FIG. 3.

Figure 8:
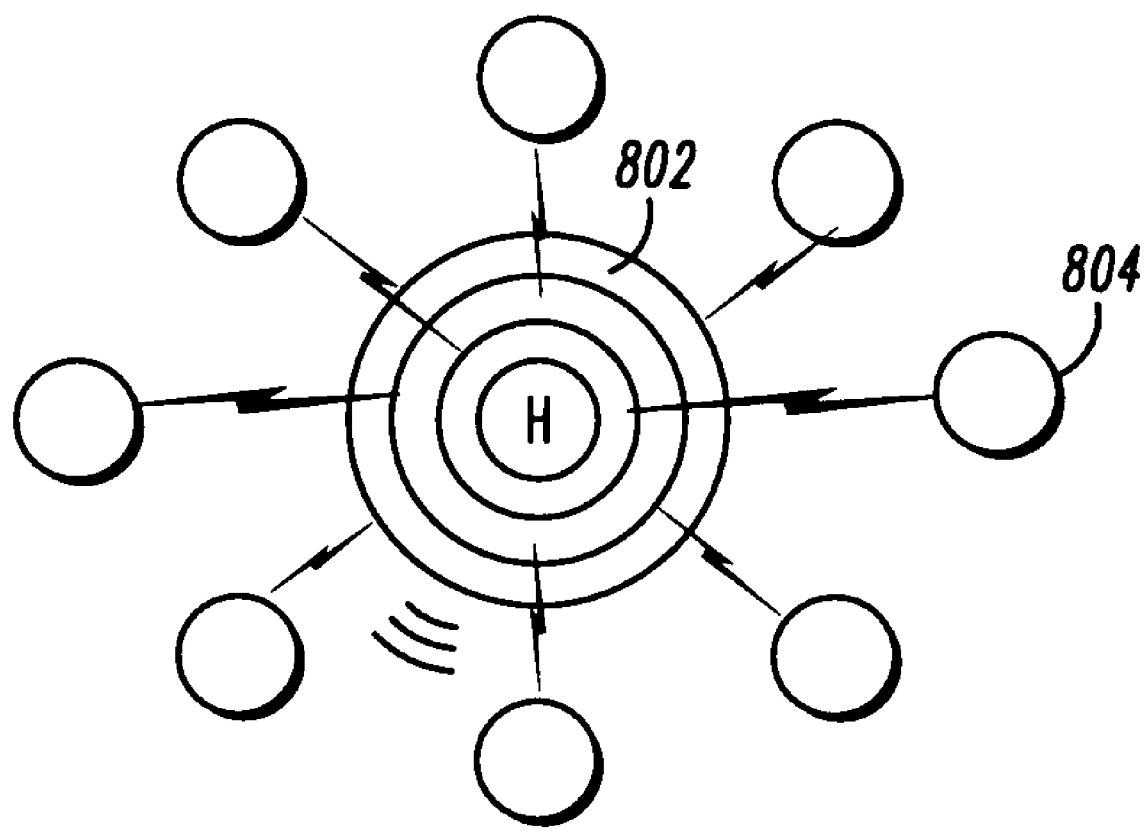
FIG. 8 is an example block diagram illustrating a typical wireless communication system in accordance with the invention.

As way of example, shown in FIG. 8 is a wireless communication network where an embodiment of the multicast protocol disclosed greatly minimizes the number of multicast packets generated. Node 804 is a common node. Node 804 sends a multicast request to home node 802. Home node 802 receives the multicast request, checks its neighbor list to see if any of its neighbors are also home nodes noting that none of its neighbors are home nodes, and sends multicast packets to the network on node 804's behalf. Thus, with one multicast request from node 804 to home node 802 and one multicast packet from home node 804, the wireless communication network of FIG. 8 receives the communication from node 804. Without an embodiment of the invention, all the nodes in FIG. 8 send multicast packets in response to the one sent by node 804. Thus, the number of multicast packets sent in response to the one sent by node 804 can number more than eight multicast packets.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. For example, the subscriber unit and/or the base radio may comprise a storage medium having stored thereon a set of instructions which, when loaded into a hardware device (e.g., a microprocessor), causes the hardware device to perform the following functions of the present invention. The present invention can be implemented in at least one of hardware, firmware and/or software. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

It should be noted that the terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

I claim:

1. A method for sending multicast packets from a first node to a plurality of nodes in a wireless communication system comprising;

creating a neighbor list identifying a type of node for each neighboring node in the wireless communication network wherein the type is chosen from the list of home and common;

sending a multicast request from the first node having a common type to a second node having a home type;

receiving the multicast request at the second node having a home type so that the second node having the home type can create a multicast packet from the multicast request;

sending the multicast packet by the second node having the home type to the plurality of nodes in the wireless communication system;

negotiating between the first node and a third node to determine which of the first node and the third node will become a node having a home type, wherein the negotiation is performed by assigning the home type to the first node or the third node with a higher MAC address; and changing the first node having the common type to the home type when the neighbor list of the first node is not encompassed by a destination list of the multicast packet.

2. The method of claim 1 wherein the multicast request is an IP data packet where the data field of the IP data packet comprises an IP multicast packet to be sent to the wireless communication system.

3. The method of claim 1 wherein the neighbor list is a routing table comprising information such as distance, signal strength, MAC address, number of hops, and the type of node.

4. The method of claim 1 wherein the step of negotiating is based upon criteria comprising receiver signal strength, transmitter signal strength, manufacturer of the first node, manufacturer of the second node, a wireless device identifier, and an IP address.

5. The method of claim 1 further comprising the step of sending the multicast request to a third node having a home type in addition to the step of sending the multicast request to the second node having the home type.

6. The method of claim 1 wherein the step of sending a multicast request further comprises sending an IP unicast packet to the second node.

7. The method of claim 1 wherein the wireless communication system is an ad-hoc network of wireless communication devices.

8. A method for sending IP multicast packets from a first node to a plurality of nodes in an ad-hoc network comprising:

creating a neighbor list of the first node which identifies each neighboring node of a plurality of neighboring nodes in the ad-hoc network wherein at least one neighboring node is a home node and the home node is assigned to the at least one neighboring node with the highest MAC address;

sending a multicast request from the first node to the at least one neighboring node wherein the at least one neighboring node is a home node and wherein the multicast request is an IP data packet;

receiving the multicast request at the at least one neighboring node so that the at least one neighboring node can create an IP multicast packet from the multicast request;

sending the IP multicast packet by the at least one neighboring node to the each neighboring node of the plurality of neighboring nodes in the ad-hoc network; and changing the first node to a home node when the neighbor list of the first node is not encompassed by a destination list of the multicast packet.

9. The method of claim 8 further comprising the step of sending the multicast request to another node that is a home node in addition to the step of sending the multicast request from the first node to the at least one neighboring node.

* * * * *